J. C. LEACH.
MACHINE FOR MAKING PAPER BOXES AND LIKE ARTICLES.
APPLICATION FILED MAY 21, 1915.

1,183,744.

Patented May 16, 1916.
6 SHEETS—SHEET 1.

WITNESS
Marshall Low

INVENTOR:
Jesse C. Leach
BY John S. Barker
his ATTY.

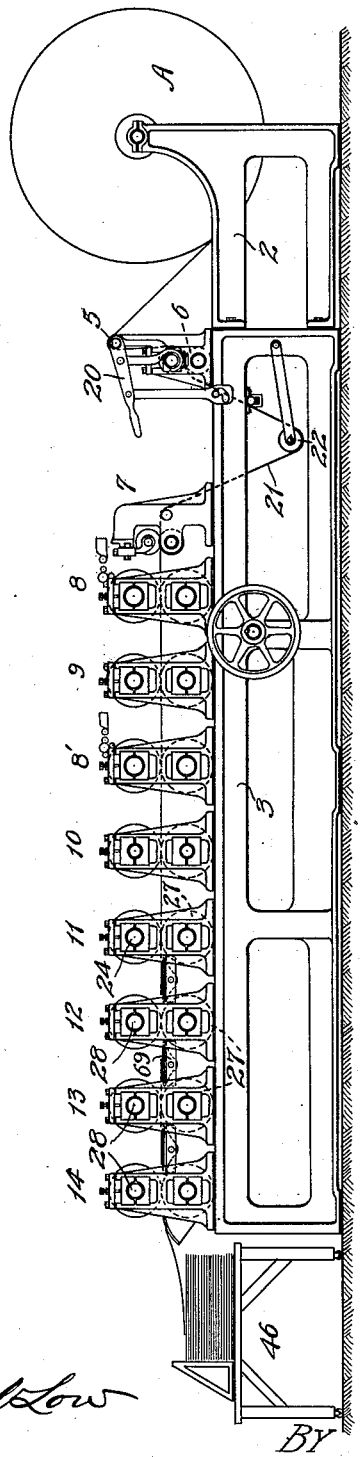

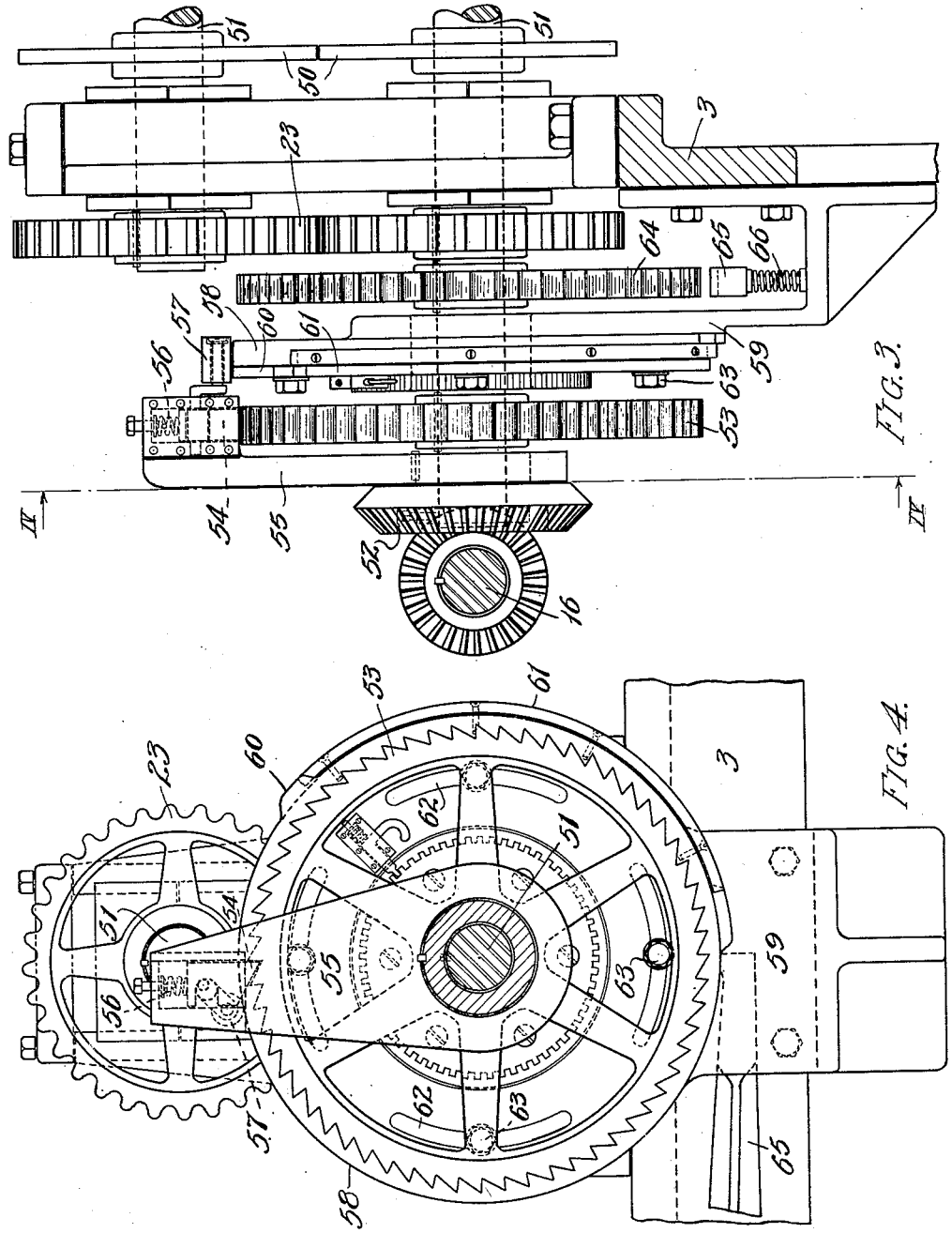

J. C. LEACH.
MACHINE FOR MAKING PAPER BOXES AND LIKE ARTICLES.
APPLICATION FILED MAY 21, 1915.

1,183,744.

Patented May 16, 1916.
6 SHEETS—SHEET 4.

WITNESS
Marshall Low

INVENTOR:
Jesse C. Leach
BY John S. Barker
his ATTY.

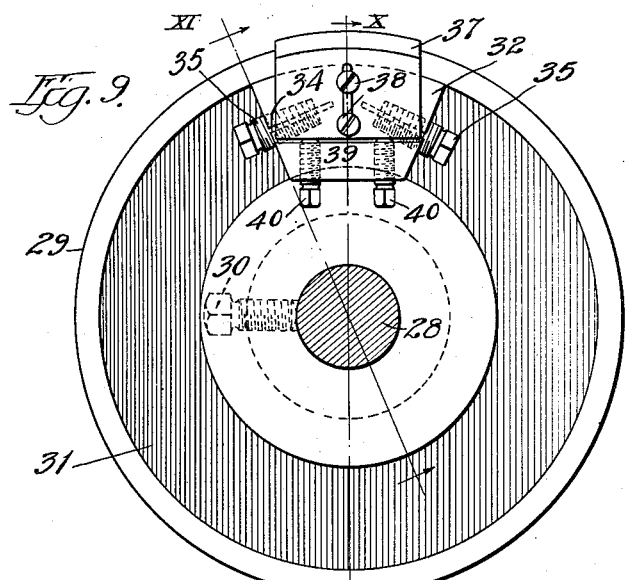
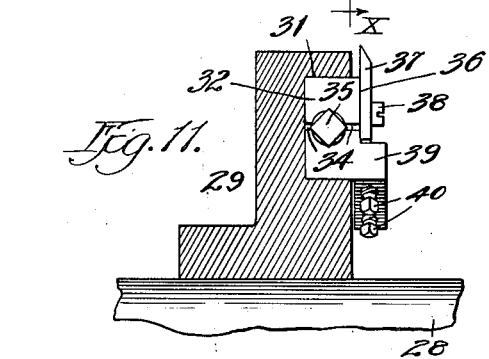
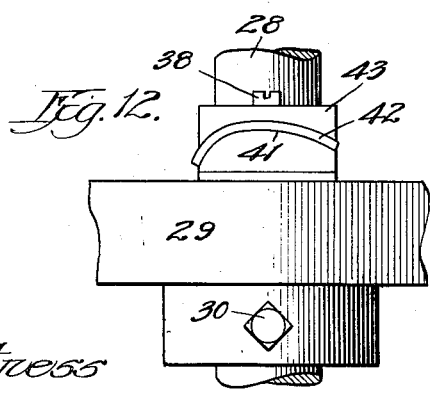
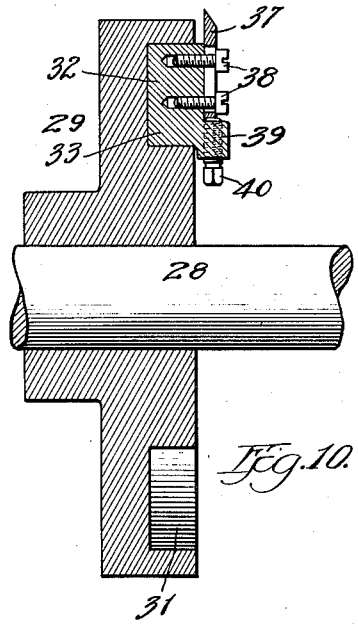
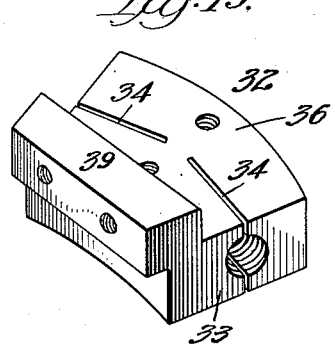

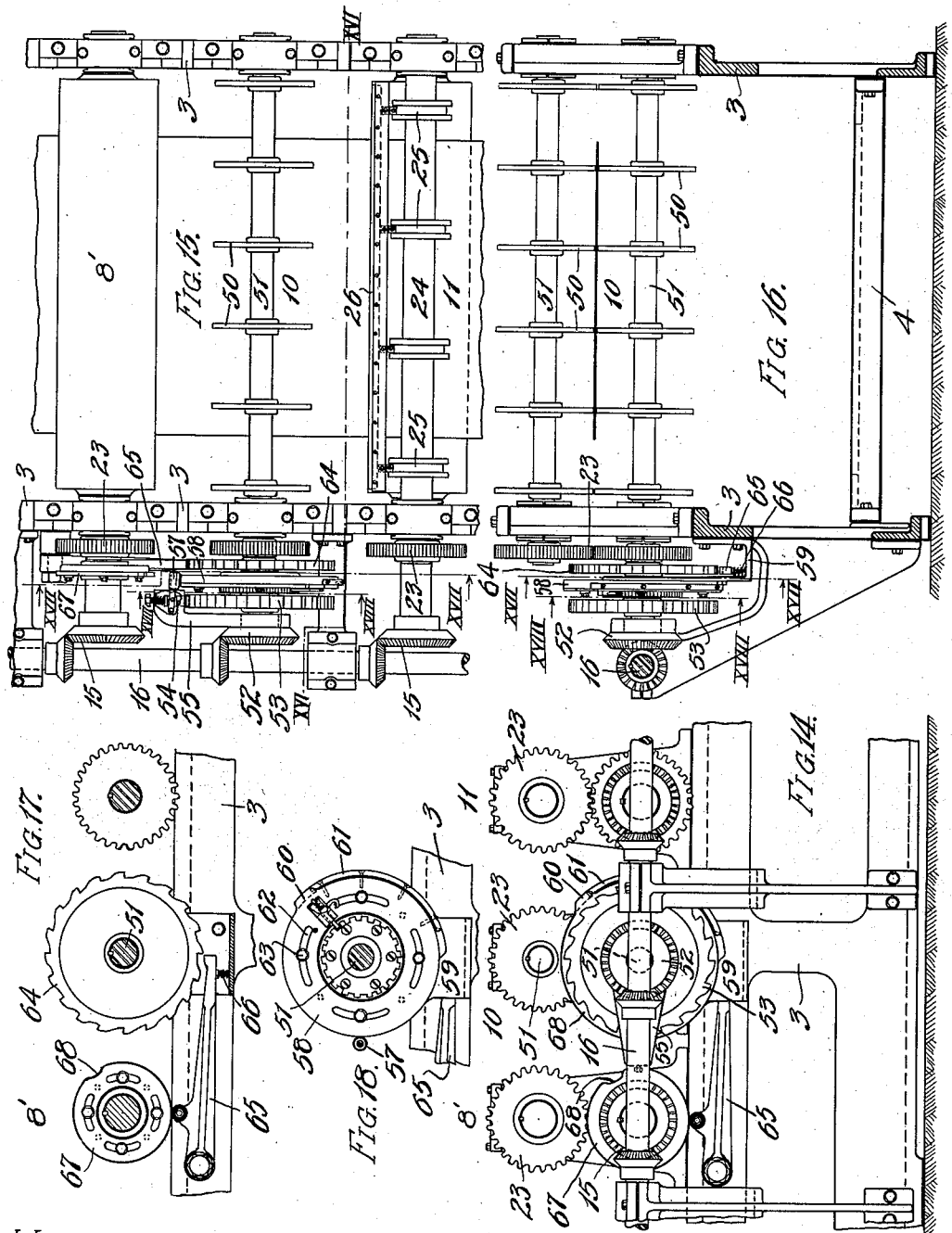

UNITED STATES PATENT OFFICE.

JESSE C. LEACH, OF CHICAGO, ILLINOIS.

MACHINE FOR MAKING PAPER BOXES AND LIKE ARTICLES.

1,183,744. Specification of Letters Patent. Patented May 16, 1916.

Application filed May 21, 1915. Serial No. 29,578.

*To all whom it may concern:*

Be it known that I, JESSE C. LEACH, a citizen of the United States, residing at Chicago, in the county of Cook and State of Illinois, have invented certain new and useful Improvements in Machines for Making Paper Boxes and like Articles, of which the following is a specification.

My invention relates to a machine for printing, cutting, creasing and scoring paper or like material to form blanks from which paper boxes or other articles may be made, and it has for its object to produce a machine of this character that may be operated continuously, is adapted to act upon a continuous web of material, has its working parts constructed and combined so as to be rotary in their movements, and which shall be adapted to produce blanks of various sizes both as to length and width, and variously cut, scored and printed as may be desired. Machines having some of these characteristics have been proposed, but my invention relates particularly to the rotary cutting and scoring devices, adjustable so as to produce from a continuous web of paper, blanks of various sizes, shapes and formation, and to the feeding mechanism, which is continuously driven, though it is intermittent in its action upon the paper, and which is adjustable so as to feed the desired amount of paper accordingly as the other elements may be set to produce a longer or a shorter blank. These objects are obtained by means of mechanism such as that shown in the accompanying drawings which is the preferred embodiment of my invention. I do not, however, wish to be understood as limiting my invention to the particular form of mechanism shown, as that may be modified and changed to a considerable extent without departing from the principle and spirit of the invention.

Figure 1:
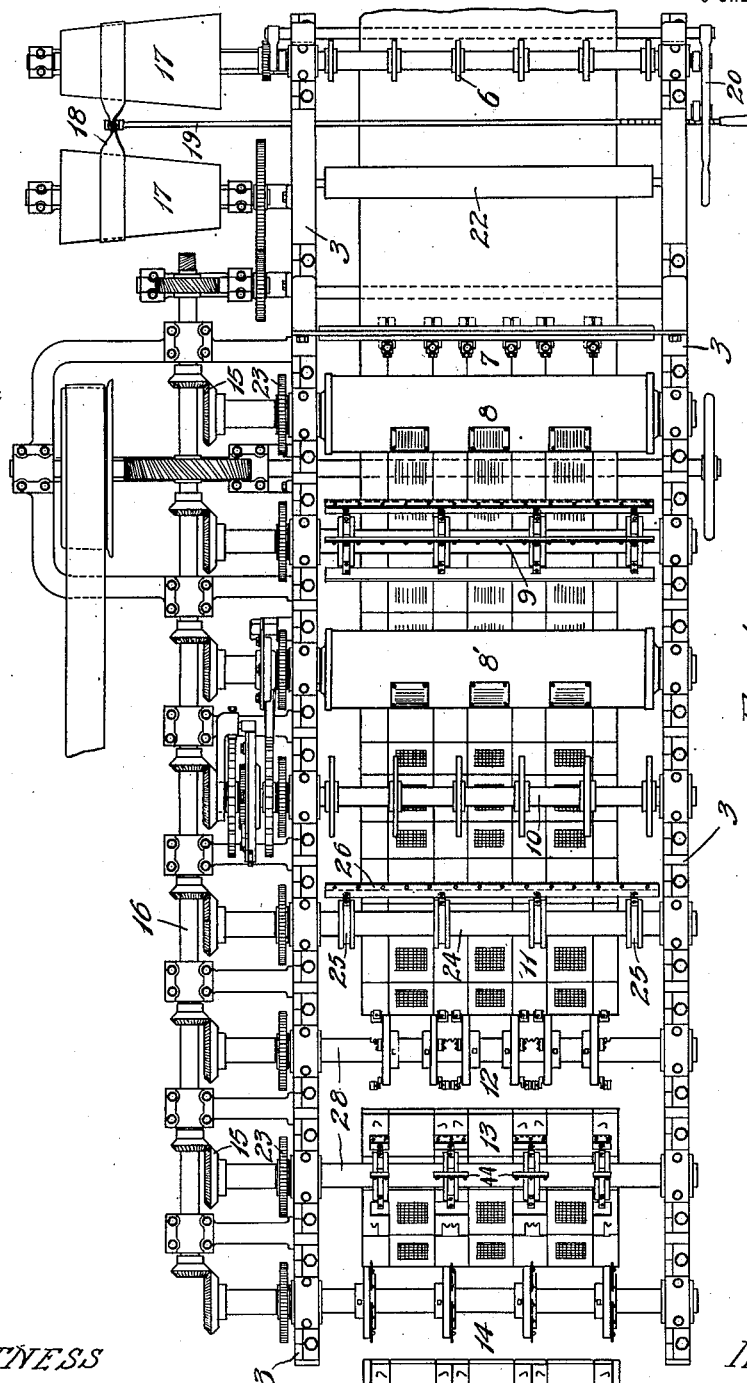
Figure 7:
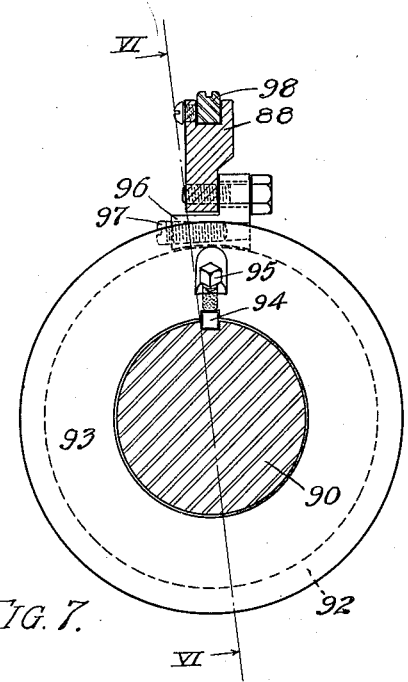
Figure 6:
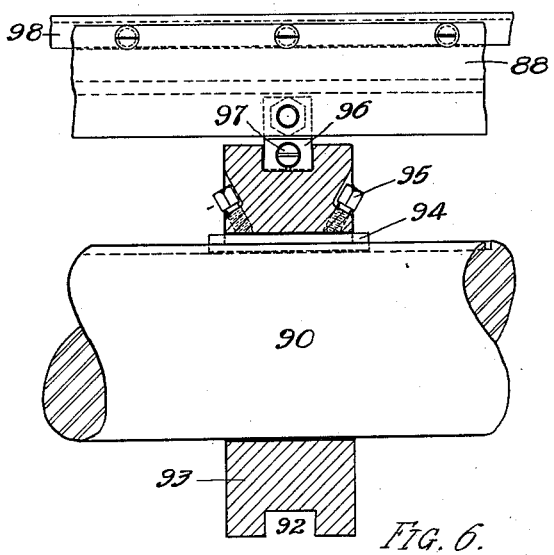
Figure 8:
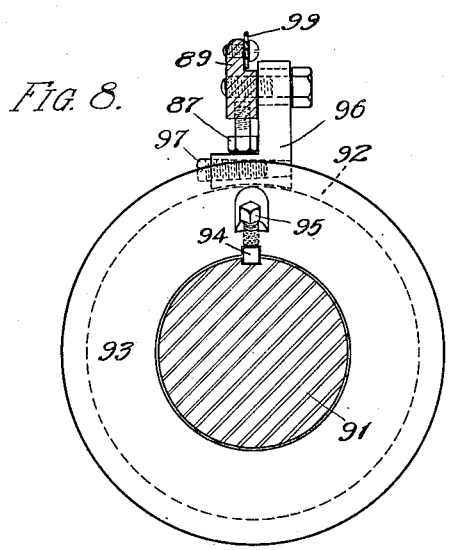
Figure 5:
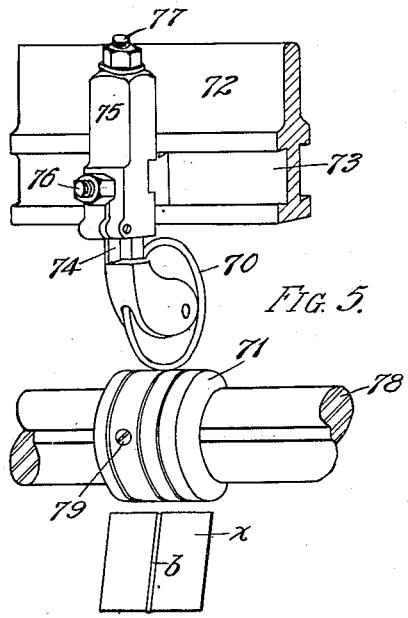

In the accompanying drawings—Figure 1 is a plan view of a machine embodying my present invention; Fig. 2 is a side elevation of such a machine; Fig. 3 is a detail view enlarged, of the driving mechanism for the controlling feeding devices employed in such machine; Fig. 4 is a sectional elevation of the parts illustrated in Fig. 3, the section being taken on the line IV—IV of Fig. 3; Fig. 5 is a detail perspective view of one unit of the devices employed for longitudinally creasing the stock material; Fig. 6 is a sectional view, taken on the line VI—VI of Fig. 7 illustrating a portion of one element of the transverse creasing devices; Fig. 7 is a transverse sectional view of the parts represented in Fig. 6; Fig. 8 is a transverse sectional view of that element of the transverse creasing devices that operates in opposition to the element represented in Figs. 6 and 7; Fig. 9 is a side elevation of one of the supports for the short adjustable cutters employed in the machine, the shaft on which it is supported being represented in section; Fig. 10 is a vertical sectional view taken on the line X—X of Fig. 9; Fig. 11 is a sectional view taken on the line XI of Fig. 9; Fig. 12 is a plan view of a support for a cutter of different shape from that illustrated in Figs. 9 to 11, parts being broken away; Fig. 13 is a perspective view of the adjustable carrier or holder for a cutter such as illustrated in Figs. 9 to 11, inclusive; Fig. 14 is a side elevation of part of the machine illustrating particularly the means for driving the controlling feeding devices, and the sets of devices immediately adjacent thereto on either side; Fig. 15 is a top plan view of that portion of the machine illustrated in Fig. 14; Fig. 16 is a transverse sectional view taken on the line XVI of Fig. 15; Fig. 17 is a vertical sectional view taken on the line XVII of Figs. 15 and 16; Fig. 18 is a vertical sectional view taken on the line XVIII of Figs. 15 and 16; Fig. 19 is a plan view of a set of blanks adapted to be cut from a single sheet of material by a machine such as illustrated in the other views; Fig. 20 is an enlarged view of one of the blanks represented in Fig. 19; and Fig. 21 is a detail view of part of a blank adapted to be produced by means of a machine such as described.

The machine that is illustrated in the drawings comprises two supporting frames, one, designated 2, in which is mounted a roll of paper or similar material, A, and another, in which are mounted the several parts of the machine that act upon the web of paper as it is drawn from the roll A, and transform the same into finished blanks or articles. This frame consists of the side pieces, 3, 3, and transverse connecting pieces 4. No attempt has been made to accurately delineate these frames in their details of construction.

The machine represented is one in which are arranged a series of creasing or scoring devices, cutting devices, printing devices, and a feeding mechanism, these parts all being constructed and arranged to be rotary and continuously driven and to act successively upon the web of material, which is taken from the roller A and passed through the machine. The order in which the several parts just enumerated act upon the web of paper is largely immaterial.

In the form of machine illustrated, the web of paper, as it advances from the roll A, passes over a roller 5 and thence between a set of feed rolls 6 that are continuously driven, these feed rolls being employed to draw off the web of paper from the heavy roll A, in order to reduce the strain upon the adjustable feed mechanism to be later described. Thence the web of paper passes to, and in succession between, the longitudinal creasing devices 7, printing devices 8, transverse creasing devices 9, other printing devices 8', the main adjustable controlling feeding devices 10, cut-off devices 11, and other cutting devices 12, 13, 14 that impart to the sheets of paper various cuts to make them into finished blanks or articles. The several parts just enumerated are mounted upon cross shafts supported in the side frame pieces 3 of the machine and are preferably driven from a common shaft 16 that receives its motion from a prime motor through any suitable train of gearing. These parts, from the printing devices 8 to the cutting devices 14, with the exception of the controlling feeding devices, 10, are connected with the shaft 16 so as to rotate at the same speed, a simple train of bevel gearing, 15, between the shaft 16 and each transverse shaft being represented. The drawing rolls 6, 6 are preferably connected with the shaft 16 through a pair of cone pulleys 17 united by a belt 18. A shifter 19 is arranged to move the belt along the cone pulleys 17 so as to vary the speed at which the rollers draw off the stock. One of the roll shafts, preferably the upper one, is movable toward and from the other, and there are combined therewith means for moving it, typified by the shifting lever 20. By this means it is possible to quickly throw out of operation the drawing-off rolls should it at any time be found necessary to stop the feed of the web of material from the supply roll A. I prefer that there should be a loop of material, 21, between the feed rolls 6 and the first rolls that operate upon the stock, in which loop lies a weight 22. There is thus produced a surplus of stock material drawn off from the roll A, that may vary in amount from time to time, and from which the material being used is immediately drawn, thus preventing the tearing of the stock, or strains upon the machine, should the drawing-off rolls 6 not run in exact synchronism with the other parts of the machine.

It will be assumed that the machine represented in the drawings is arranged to produce a blank for a paper box, like that shown in Figs. 19 and 20 of the drawings. This blank, B, is represented as being longitudinally creased, as indicated at $b$, $b$, transversely creased, as represented at $b'$, and longitudinally cut along lines $c$, $c$, to form the flaps $d$, $d'$, $d^2$ and $d^3$. It will be understood that this blank is one arbitrarily chosen for the purpose of illustration in this case, and that while the machine shown is adapted to make the blank, it is equally well adapted to make a wide variety of others differing therefrom in length, width, configuration and the manner in which it is cut and creased.

No attempt is made to represent in detail the printing devices, which may be of any preferred rotary type. They may be arranged to print only one face of the blank, or both faces thereof, and in one color, or in two colors if two sets of printing devices are used, as shown.

In the arrangement of machine shown the first act performed upon the material is that of longitudinally creasing it by means of the devices designated as a whole by 7, which produce the creases $b$ in a blank like that designated B. These longitudinal creasing devices preferably consist of a series of adjustable creasing disks or wheels 70 and coöperating grooved cylinders 71, the former in the arrangement shown being arranged above the web of material, and the latter below it. In Fig. 5 one set of creasing devices is represented in detail. Referring to this figure, 72 designates a transverse bar suitably supported in the framework of the machine and longitudinally grooved at 73, or otherwise arranged to receive and support as many of the creasing disks 70 as may be required in executing the particular work that the machine is at the time set for. The creasing roller 70 is supported so as to turn freely in the lower portion of a vertically adjustable carrier 74 that is mounted in a support 75. The latter is supported by the cross-bar 72, being adjustable along the groove 73 therein, and adapted to be held in any position to which it may be adjusted by locking devices 76. The vertical movements of the creasing wheel are effected by the adjusting devices 77. The grooved cylinder 71 that works in coöperation with the creasing wheel 70 is supported upon a shaft 78 suitably mounted and free to rotate. The cylinder 71 may be moved along the shaft 78 and is held in the position to which it is adjusted by a set screw 79.

In Fig. 5 I have represented a small piece of material, $x$, in which has been formed a crease or groove $b$ by means of the devices illustrated in that view. After leaving the creasing devices 7 the stock material passes to the printing devices 8 that carry the desired printing forms. In the machine represented in Fig. 1 the printing devices 8 have three forms, since such machine is arranged to simultaneously produce three sets of finished blanks.

The next parts to act upon the stock are the transverse creasing devices 9 that are arranged to produce creases $b'$ represented in Fig. 20. This part of the machine is illustrated in detail in Figs. 6, 7 and 8. It consists of a pair of transverse driven shafts 90, 91, one arranged above the plane of travel of the web of material, and the other below such plane. As is the case with the other sets of driven devices that have been mentioned, excepting as stated the main controlling feeding devices 10, these shafts are positively and uniformly driven. One of the shafts, preferably the lower one, is connected with the drive shaft 16 through the train of gearing 15, and the upper shaft is driven from the lower one through a train of gearing 23. Upon each shaft, 90 and 91, is mounted a set of supporting disks 93 that are circumferentially grooved as indicated at 92. The disks are adjustable lengthwise along the shafts that carry them and are held in the positions to which they may be adjusted by keys 94 that enter longitudinal grooves formed in the shafts, and set screws 95 that bear upon the keys. Supporting blocks 96 are seated in the circumferential grooves 92 of the carrying disks 93, being adjustable circumferentially therein about the disks, and held in place after adjustment by screws 97 arranged to expand the portions of the supports 96 that are seated in the grooves and force them into secure frictional engagement with the walls thereof. The transverse creasing is directly effected by sets of creasing blades 98, 99, one of which,— the one designated 98,— is grooved, the other, 99, being narrow and its edge adapted to enter the groove in the part 98, carrying the stock material therein sufficiently to produce the desired crease. The creasing blades 98, 99, are preferably directly supported respectively by longitudinal carriers, 88, 89, suitably secured to the supports 96. One of the creasing blades,—the one designated 99 in the drawings,— is adjustable radially, by means of screws 87 that engage with the carriers 89 and with some abutment, such as the support 96. By the arrangement shown as many or as few transverse creasing devices as may be required in making the particular article being manufactured on the machine may be employed, and these set in positions to cause the creases to be properly placed, the desired adjustments being possible by reason of the grooves in the disks 93 and the supports 96 circumferentially adjustable in such grooves. Next beyond the transverse creasing devices are a second set of printing devices designated 8'. These are used where the blanks or articles being produced carry printed matter in two colors. It will be understood that the second set of printing devices might be omitted or the number increased and that the sequential arrangement of the printing devices, with reference to the other parts, may be changed, that illustrated in the drawings being the arrangement that is preferred in a machine organized as illustrated.

The next parts in order of operation to act upon the stock material are the feeding devices 10, but the description of this portion of the apparatus will be deferred and will appear in a later part of this specification.

Next beyond the feeding devices 10 are the cut-off devices 11 arranged to sever the web transversely into separate sheets. These devices are preferably similar in many features to the transverse creasing devices already described. As represented in Fig. 1 they comprise an upper transverse driven shaft 24 carrying a set of grooved supporting disks 25 by which is supported the transverse cut-off knife 26. The supports for the knife may well be similar to those for the transverse creaser 99 represented in Fig. 8. The blade or knife 26 preferably acts against a lower cylinder 27 of smooth metal and of a length equal to the width of the stock the machine is capable of operating upon. The blade 26 is represented as being straight and of a length sufficient to sever at one operation the web of material from edge to edge, but it is apparent that the cutter could be broken into a set of independent parts and that these, or the entire blade, might be set at an angle to the lines of movement of the material instead of being transverse as shown in the drawings.

The cutting devices 12, 13 and 14, any one set, or all, of which may be used in making a particular article, carry cutters, that are adjustable and substitutable, for producing the particular cuts or other manipulations that may be incident to the production of the particular article being made upon the machine. Thus in the machine represented in Fig. 1 the devices 12 are provided with a set of small cutters adapted to produce the flaps of a blank like that shown in Figs. 19 and 20. The devices 13 are provided with short transversely arranged cutters 44, or they might be creasers, for acting upon the blanks; while the devices 14 carry trimming or shearing cutters for severing the sheets longitudinally, separating the blanks one from the other, and shearing the edges of the sheet. It will be understood that this arrangement is typical, it being one of the objects of the invention to produce a machine that is capable of easy adjustment so that the cutters or operating instrumentalities carried respectively by the sets of devices 12, 13, 14 may be quickly and easily removed, changed, or substituted as occasion may require.

Referring to Figs. 9, 10, 11, 12 and 13, which illustrate in detail the means employed for supporting the cutters of the devices 12, and 14, 28 indicates the upper driven cross shaft upon which are mounted the carriers for the cutters. The shaft 28 is driven continuously as by gearing similar to that described in connection with the transverse creasing devices 9. Upon this shaft are mounted a set of disks 29 each adjustable lengthwise of the shaft and adapted to be secured thereto by a set screw 30 or other suitable means. In one face of each disk is formed an axially concentric groove 31, and in this groove are mounted the cutter holders 32. Each cutter holder is formed with a segmental shaped block or piece 33 that fits the groove quite closely, yet with sufficient looseness to permit it to be easily moved therein from one position to another. The block is slit, as indicated at 34, 34, and is adapted to be expanded into close and binding engagement with the walls of the groove 31 by tapering screws 35 that enter tapering screw-threaded apertures formed therefor in the block, the apertures being crossed by the slits 34. The insertion of the screws operates to widen the slits and expand the block and so secure the holder in the position to which it may be set. The block preferably extends outward laterally beyond the grooved face of the disk 29, and its outer face 36 may constitute the support against which is held a cutter 37 that is secured to the block by screws 38. 39 indicates a flange extending outward from the block 33 and serving as a seat for adjusting screws 40 that engage with the inner edge of the cutter 37, and by means of which it may be accurately set radially in order to properly act upon the material. The devices against which the cutting blades or other operating instrumentalities may be clamped may be variously shaped and inclined. Thus in Figs. 9 to 11, inclusive, the face 36 is flat and lies in a plane cutting the shaft 28 at a right angle, and a knife 37 that it supports has a cutting edge lying in a plane parallel with the lines of movement of the stock material, such a knife being arranged to shear the material longitudinally. If the knife be made short it may be employed to produce a slit parallel with the direction of movement of the material.

In Fig. 12 the supporting face 41 is curved, and against this is clamped a cutting blade 42 adapted to produce a curved cut, and when a cutting blade of this shape is to be supported it is found advantageous to use an outside clamping piece 43, held in place by a screw or screws and between which and the face 41 the cutter is securely held.

The two illustrations just described are sufficient, it is thought, to indicate that both the shape and style of cutter and the angle at which it is supported with reference to the planes of movement of the stock material may be varied at pleasure and to suit the character of the work which the machine is intended to perform.

In Fig. 1 the devices indicated as a whole by 13 are represented as being provided with short transversely arranged instrumentalities for acting upon the paper stock, designated 44. These may be either cutters or creasers, and are supported by means similar to those employed for supporting the cut-off knife 26 already described. The lower members of the sets of devices, indicated by 12, 13 and 14, that is, the parts thereof below the plane of the path followed by the stock material being operated upon, are not shown in detail, as they may be of any suitable character, as for instance a plain metal cylinder against which the cutters or creasers act, and the reference character 27 employed in Fig. 2 indicates such devices.

It will be seen that the several instrumentalities employed for acting upon the stock material in the set of devices designated 12, 13 and 14, are short and relatively simple, as I have found it advantageous and cheaper to employ a number of cutting or creasing devices of this kind that act upon the stock successively, rather than a single complicated cutter that produces all of the cutting required by a single operation. The cutting devices and the supports therefor that I have invented have been devised and produced with especial reference to securing the advantages incident to the use of a number of short cutters or knives or creasers of simple construction in producing blanks containing parts of irregular shape. These advantages are secured by using short cutters or creasers and supporting them in such a way that they may be easily adjusted, both longitudinally and transversely, and either closer together or farther apart so as to produce the desired effects upon the material being wrought into a finished article. To illustrate further this feature of the invention I have, in Fig. 21, represented a small section of a blank for a paper box having a locking tongue of irregular shape, designated $e$, such tongue being carried by a flap, designated $d^4$. In cutting the stock material to produce this flap and tongue it may be assumed that the cutting devices 12 carry one set of knives that produce irregular shaped cuts, part straight and part curved, such as indicated at $g$, and a second set of knives producing irregular cuts $f$. The cutting devices 13 may carry short transversely arranged cutters adapted to sever the flap $d^4$ at its ends, producing the cuts designated $i$, while the third set of devices, 14, may carry cutters for producing the irregular shaped incisions designated $h$. These operations take place in succession, in the desired sequence, until the piece of stock material has been completely shaped in the desired manner.

The controlling and intermittently acting feeding devices indicated generally in Figs. 1 and 2 by the character 10, and illustrated more in detail in Figs. 3, 4, 14, 15, 16, 17 and 18 will now be described.

The feeding means that act directly upon the stock material consist preferably of circular disks 50 mounted respectively upon transverse shafts 51, 51, that are arranged directly one above the other and are geared together so as to rotate at the same speed but in opposite directions. Supported loosely upon one of the shafts, preferably the lower one, is a bevel gear 52, and inside of this gear and secured fast to the shaft is a ratchet wheel 53. A pawl 54 carried by an arm 55 secured fast to the bevel wheel 52 so as to rotate therewith, is adapted to engage with and drive the ratchet wheel 53 and through it the stock feeding disks 50. A spring 56 acts upon the pawl and tends to force it into working engagement with the ratchet wheel. The operation of the pawl is controlled, however, by a stationary cam with which a contact piece 57 carried by the pawl engages. This controlling cam is supported by a disk 58 carried by some stationary part of the framework, such as the bracket 59. The disk is provided with a projecting segment 60 that constitutes the throw-off cam and this cam may be extended in length by added segmental pieces 61 secured to the rim of the disk as represented in Figs. 4 and 18. The cam support may be mounted so as to be adjustable as a whole about the axis of the shaft 51, the means for permitting such adjustment and for holding it securely after it has been adjusted being represented in Figs. 4 and 18. The disk 58 is preferably composed of two parts, one of which carries the cam projection 60 and is in the form of a face plate adjustably secured to a supporting back plate, the cam-carrying face plate being slotted, as at 62, and held against the supporting back plate by screws 63 passing through the said slots. 64 is a ratchet wheel secured fast to the shaft 51, and arranged to be engaged by a locking pivoted dog 65. This dog is acted upon by a spring 66 which tends to move it into locking engagement with the ratchet wheel, and is controlled in its movement by a cam disk 67 that is supported upon one of the continuously driven transverse shafts of the apparatus, such as the lower transverse shaft of the printing devices 8'. The cam disk 67 is supported so as to be adjustable about the axis of said shaft and is provided with a short cut-away portion 68 that allows the locking dog 65 to come into engagement with the ratchet wheel 64 and stop the rotation thereof and thus positively lock the intermittently operating control feeding devices. This cam device 67 is adjustable, or replaceable by other cam devices, similar to the one shown in the drawings except that the length of the cut-away portion varies, it being understood that the cam 67 should permit the locking dog to act during such period of time as the cam 60, 61, is acting to hold out of engagement the feeding pawl 54. From this description, taken in connection with the drawings, it should be clear that while the bevel wheel 52 and the arm 55 that it carries are traveling continuously, and in perfect synchronism with the other parts of the machine, they operate to rotate the feeding disks 50 only so long as the driving pawl is in engagement with the ratchet wheel 53. During the rest of the time the said driving devices are rendered inoperative, by the cam 60, 61, aforesaid, and are positively held stationary by the locking dog or pawl 65.

It will be understood that the positively driven mechanisms that operate upon a web of material before it reaches the feeding devices 10, while all rotating continuously, may, and in fact usually do, act upon the material intermittently. Thus the printing devices carry forms that are segmental and less than the complete circumference of the cylinders that carry them, so that these devices act upon the stock material only when the forms come opposite thereto, being at other times inactive as to such material, though continuously rotating. The stock material as it comes from the feeding devices 10 is advanced intermittently, but with a uniform speed while it is in motion. Some or all of the devices that are disposed in advance of the cut-off devices 11 operate upon the sheets of stock material to feed it forward, and since they rotate continuously the sheets of material after being severed from the web by the cut-off devices will be separated one from the other, the relative length of the space between successive sheets being determined by the length of the dwell or rest that occurs between each successive advance of the web of stock material caused by the controlling feeding devices 10.

I prefer to arrange between the sets of devices that are in advance of the cutting devices 11 supports for the sheets of paper, these being indicated in Fig. 2 and designated 69. From the discharge end of the machine the finished blanks or articles are delivered upon a table 46 or other desired form of receiver therefor.

It will be seen that the parts 50 of the feeding devices 10, and the parts of the other devices that act upon the stock material to transform it into finished articles, rotate with the same peripheral speed, so that no one set of devices tends to crowd the material upon the next set, nor to draw it therefrom. It will also be observed that the feeding devices may be adjusted, by the adjustment of the driving connections between them and the source of power so that the proportional length of time during each revolution that they operate upon the stock material may be varied; and also that the devices that act upon the stock material to transform it into finished articles are also adjustable, so that while continuously rotating they act a greater or less proportion of each revolution, accordingly as they are adjusted, thus producing longer or shorter articles.

In this specification and following claims I employ the term "cutting devices" and "cutters" to include all means that either sever, crease, indent, perforate, or in like manner act upon the stock material since such devices are in a sense analogous and adapted to be designated by a single generic term, such as above indicated.

What I claim is:

1. In a machine for forming blanks and other articles from a continuous web of stock material, the combination of intermittently operating, rotary feeding devices for feeding the material through the machine, means for varying at will the amount of advance imparted to the stock material by each rotation of the feeding devices, and continuously driven rotary cutting devices for acting upon the material so fed, the peripheral speeds of the feeding devices and of the cutting devices being uniform and the same.

2. In a machine for forming finished blanks and other articles from a continuous web of stock material, the combination of intermittently operating, rotary, feeding devices for the material and continuously driven rotary devices carrying cutters for acting on the material and transforming it into finished articles, the cutters being adjustable peripherally whereby they may be set to produce articles of a length equal to the length of feed of the feeding devices.

3. In a machine for forming finished blanks and other articles from a continuous web of stock material, the combination of intermittently operating, rotary, feeding devices, means for adjusting the said feeding devices to vary the proportion of the length of time during each revolution that they operate to feed the material, and continuously driven rotary devices carrying cutters that act on the material to transform it into finished articles, the said cutting devices being adjustable peripherally and the peripheral speed of the said cutting devices and of the feeding devices being the same.

4. In a machine for forming finished blanks and other articles from a continuous web of stock material, the combination of rotary, intermittently operating feeding devices for the material, continuously driven rotary devices carrying cutters for acting on the material and transforming it from a web into finished articles, such cutting devices being peripherally adjustable, and means for adjusting the feeding devices to vary the proportional length of time during each revolution that they operate to feed the material,—the peripheral speed of rotation of the cutters and of the feeding devices being the same, and the length of time taken by the feeding devices in making a single advance of the material and the rest between such advance and the beginning of the next advance being equal to the length of time required by the rotary cutting devices to make a complete rotation.

5. In a machine for forming finished blanks and other articles from a continuous web of stock material, the combination of a continuously operating source of power, rotary feeding devices, intermittently operating connections between the source of power and the feeding devices, means for varying the relative length of time the said connections are in operation to drive the feeding devices, rotary devices carrying cutters for acting on the stock material and transforming it into finished articles as it is fed through the machine, the said cutters being adjustable to operate upon the material a greater or less proportion of each revolution accordingly as they are adjusted, and driving connections between the source of power and the said rotary devices carrying the cutters, arranged to drive the latter continuously and uniformly.

6. In a machine for forming finished blanks from paper and like stock material, the herein described means for making incisions of irregular shape in the material comprising a series of sectional cutters arranged to act upon the material to produce the irregular incisions, and rotary carriers for the cutters, the cutters being each adapted to produce a part only of the incision and being separated from each other so as to act successively upon the material.

7. In a machine for cutting articles of irregular shape from stock material, the combination of means for feeding the material forward, a series of rotary carriers past which the material is fed, and a series of relatively short sectional cutters adapted together to produce a cut of irregular shape, and supported in the said carriers and separated from each other so that they act on the material successively, each cutter being arranged to make a section of the irregular cut required to produce the article being made.

8. In a machine for forming articles from paper or similar stock material, the combination of a series of rotary carriers past which in succession the material is caused to move, and a series of relatively short cutters for acting on the material arranged together to make a single cut in the article, supported by the said carriers, the cutters being separated from each other so as to act on the material successively, and being easily removable whereby one may be substituted for another, and being independently adjustable circumferentially in their carriers.

9. In a machine for forming articles from paper or similar stock material, the combination of a rotary disk having in its face a circumferential groove, a cutter carrier having a block adapted to be seated in the said groove and freely adjustable therein, the carrier extending out beyond the face of the disk, a cutter secured to the said outward extending portion of the carrier, means for adjusting the cutter radially, and means for securing the carrier block in the said groove.

10. In a machine for forming finished blanks and other articles from a continuous web of paper or like stock material, the combination of rotary cutting devices for acting on the material, rotary feeding devices, a continuously driven source of power, rotary connections between the source of power and the said feeding devices, means for intermittently throwing into and out of action the said connecting means whereby the operation of the feeding devices is rendered intermittent and means for driving the cutting devices that act on the material at the same peripheral speed as the peripheral speed of the feeding devices.

11. In a machine for forming finished blanks and other articles from a continuous web of paper or like stock material, the combination of rotary cutting devices for acting on the material, adjustable so as to produce articles of different lengths accordingly as the cutters are adjusted, rotary feeding devices, a continuously driven source of power, rotary connections between the source of power and the feeding devices for imparting a uniform speed to the feeding devices, adjustable means for rendering the operation of the feeding devices intermittent, and connections interposed between the source of power and the said cutting means arranged to drive them with the same peripheral speed as the feeding devices are driven.

JESSE C. LEACH.

Witnesses:
HORACE W. BINGHAM,
HERBERT L. DIBBLE.